United States Patent [19]

Chertok

[11] 4,083,093
[45] Apr. 11, 1978

[54] MULTIPLE MATERIAL SOLAR PANEL AND METHOD AND APPARATUS FOR MANUFACTURING THE SAME

[76] Inventor: Burton Z. Chertok, L'Ecluse La., Huntington Bay, N.Y. 11743

[21] Appl. No.: 603,047

[22] Filed: Aug. 8, 1975

[51] Int. Cl.² .................................................. B23P 15/26
[52] U.S. Cl. ............................................... 29/157.3 V
[58] Field of Search ................... 29/507, 523, 157.3 V

[56] References Cited

U.S. PATENT DOCUMENTS

| 171,440 | 12/1875 | Smith | 29/523 |
|---|---|---|---|
| 642,539 | 1/1900 | Thoma | 29/523 |
| 895,412 | 8/1908 | Badger | 29/523 |
| 904,189 | 11/1908 | Everson | 29/523 |
| 2,093,092 | 9/1937 | McElhany et al. | 29/507 X |
| 2,263,714 | 11/1941 | Bloomfield et al. | 29/523 |
| 2,458,189 | 1/1949 | Morgan | 29/157.3 V |
| 2,991,543 | 7/1961 | Heuer et al. | 29/157.3 V |
| 3,167,405 | 1/1965 | Muije et al. | 29/157.3 V X |
| 3,434,194 | 3/1969 | Whittaker et al. | 29/523 X |
| 3,724,537 | 4/1973 | Johnson | 29/157.3 V |
| 3,769,691 | 11/1973 | Puzik | 29/523 |

*Primary Examiner*—C.W. Lanham
*Assistant Examiner*—V. Rising
*Attorney, Agent, or Firm*—Posnack, Roberts & Cohen

[57] ABSTRACT

A method is provided for fabricating a solar panel of different interior and exterior materials to utilize the structural and heat absorbing properties of the exterior material and the corrosion resistance of the interior material. The materials are intimately wedded along the entire length of the same by applying a fluid pressure internally against the interior material and simultaneously throughout the entire lengths of the same to displace the interior material into intimate contact with the exterior material. The fluid pressure is applied with a force which permanently deforms the interior material but which is within the elastic limit of the exterior material so that when the pressure is relieved, the exterior material contracts against the interior material causing it to deform inwardly due to compression. The resultant dimensional excursions of the interior material results in the work hardening of same. The exterior material is formed by extrusion to have diametrally extending fins, one of which terminates in a socket so that a plurality of such panels can be readily assembled in edge-to-edge relation. The apparatus employed incorporates hollow mandrels for internally engaging the lining and supporting the same while permitting a fluid pressure to be internally applied thereto and while, at the same time, permitting a relief of the pressure so that the elastic limit of the exterior material is not exceeded. The apparatus furthermore includes a device for applying the pressure impulse or impact force to the lining for deforming the lining against the exterior part.

16 Claims, 11 Drawing Figures

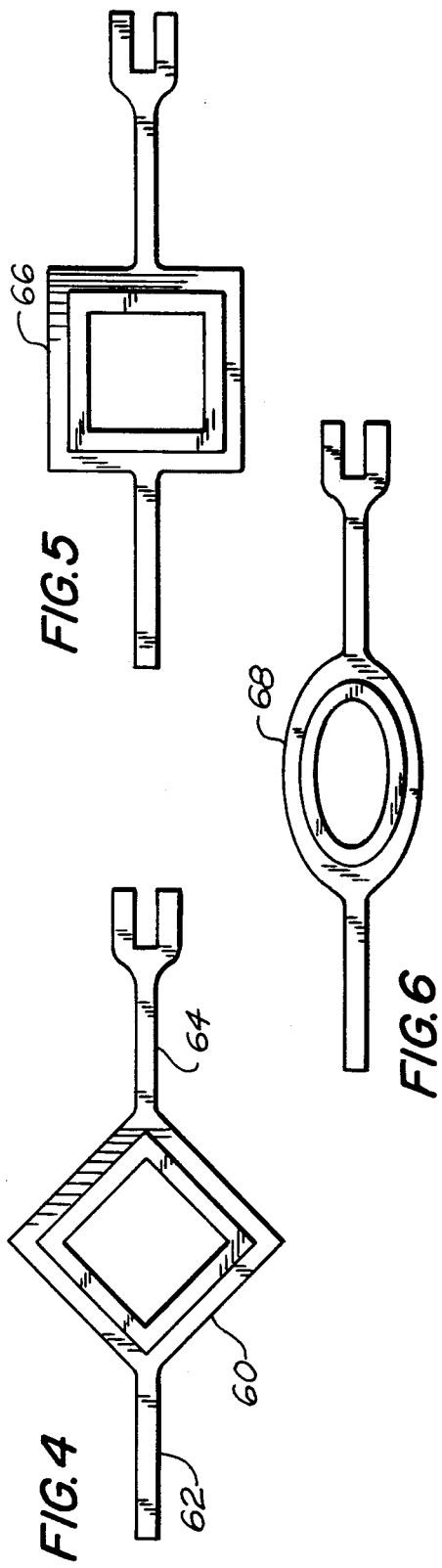
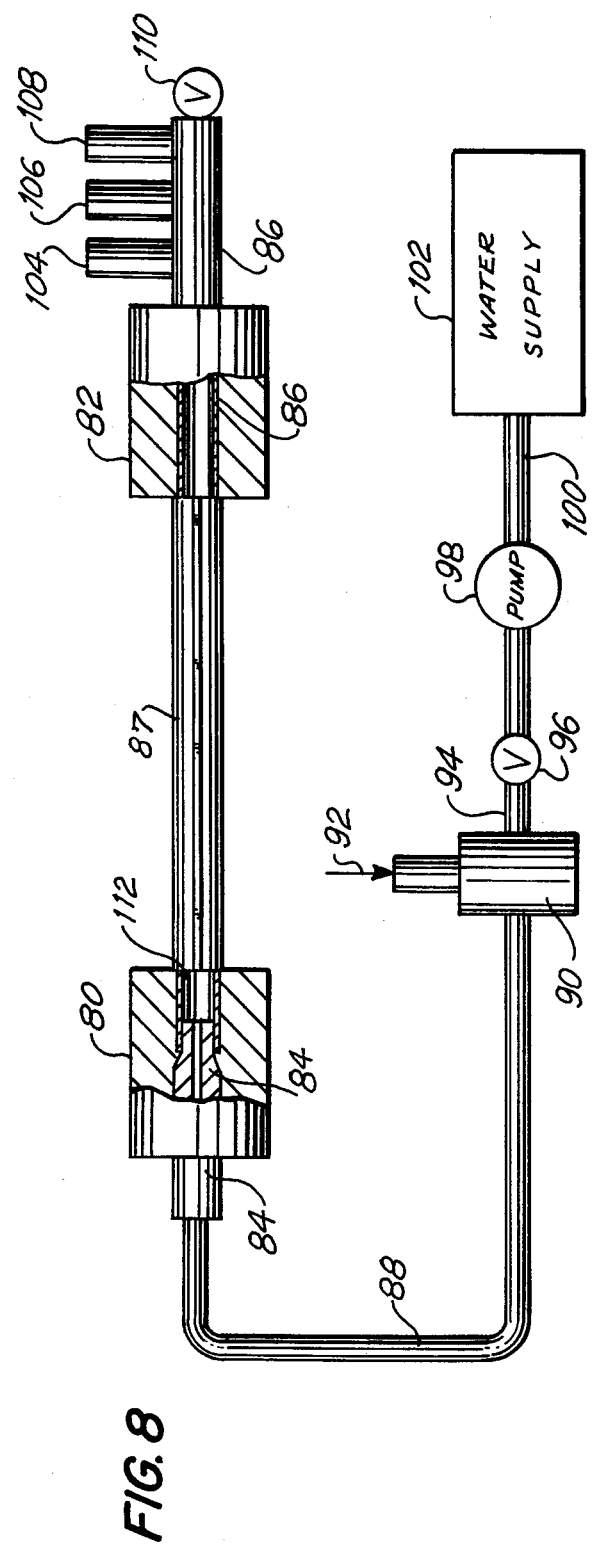

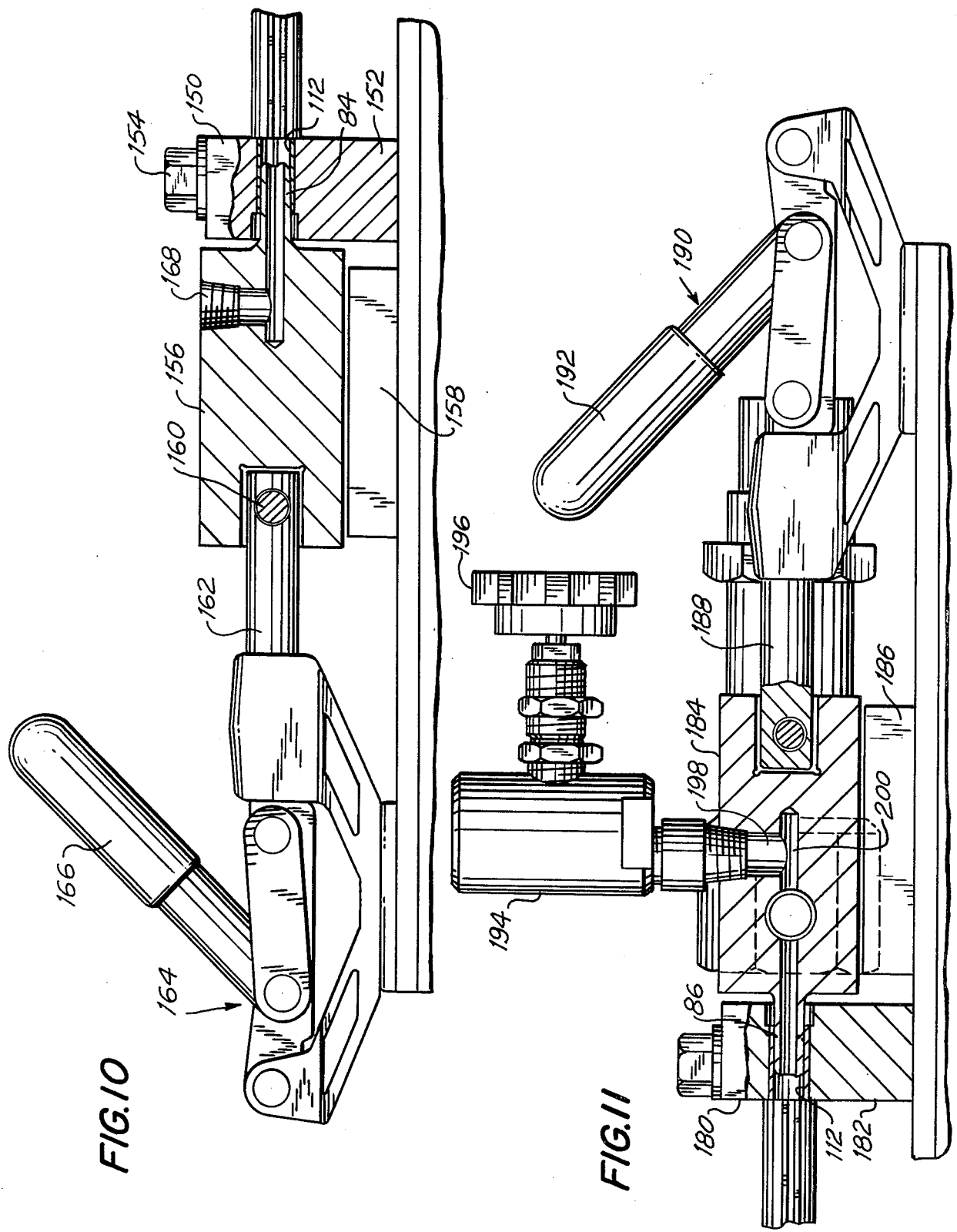

MULTIPLE MATERIAL SOLAR PANEL AND METHOD AND APPARATUS FOR MANUFACTURING THE SAME

FIELD OF INVENTION

This invention relates to solar panels and assemblies of solar panels and applies as well to methods and apparatus for manufacturing solar panels from a plurality of materials one of which is employed to line the other whereby the structural and heat absorbing properties of the exterior material may be best utilized along with the corrosion resistance of the interior material or lining.

BACKGROUND

While it seems no longer necessary to emphasize the importance of recovering and employing solar heat, an article has recently appeared on June 8, 1975 in the New York Times dealing with this subject. This article generally points out that water or another liquid may be heated by the sun as the liquid passes through an appropriately disposed solar collector or panel with the heat being thereafter transferred to a storage facility such as, for example, water or rocks, this heat then being used when needed to heat domestic hot water and air that may be blown through a dwelling or other such construction. This article goes on to point out that all types of businesses were represented at the International Solar Industry Expo '75 and that there are high hopes for the solar industry especially as fuel costs continue to rise and as the populace grows more aware of pollution. It is pointed out that a survey had indicated that there will be a United States market of 1.3 billion dollars for solar heating and cooling systems by 1985 with a larger surge in potential sales during the following 15 years. The article points out moreover that black absorber panels have been employed into which is built a series of tubes filled perhaps with ethylene glycol acting as an anti-freeze although it in fact is known that water or some medium other than water or ethylene glycol can be employed to carry heat absorbed by the panel. In fact a wide variety of panels appear to have been developed all of which suffer certain disadvantages which will be discussed in greater detail hereinafter.

One of the problems encountered in the design of solar collector panels is that of corrosion in water based systems by virtue of the fact that water is employed for conveying heat collected by such panels to a heat storage system. Occasionally this problem can be avoided by chemical treatment of the water and by the use of deionized water and/or getter columns and so forth. Copper panels have the necessary corrosion resistance, but unfortunately such copper panels are heavy and expensive as compared to aluminum panels. Aluminum panels, on the other hand, have the necessary structural strength and the heat conductivity which is required, but aluminum by itself does not have sufficient corrosion resistance as to warrant its use in the form of a solar panel.

Olin Brass appears to have developed an aluminum Roll-Bond (trademark) solar collector panel which provides for the utilization of either aluminum or copper. This is accomplished by rolling sheets of copper or aluminum together and bonding the same and expanding the combined sheets in certain areas to form channels which permit fluid or refrigerant to be circulated. It is stated that the heat transfer characteristics of such a panel are excellent and enable a continuous and predictable rate of heating or cooling to be obtained from the associated system. I believe, however, that this system does not make for the most efficient use of materials. Where copper must be employed for corrosion resistance purposes in this system, it must be present in all areas including those which do not come in contact with the heat transfer fluid. This makes for an excessive usage of copper giving rise to increased weight and costs.

In preparing for the filing of a patent application, I have encountered various prior patents which do not effectively anticipate my invention, but should be mentioned for purposes of complete disclosure. Thus, for example, I am aware of the Kawano U.S. Pat. No. 3,081,825 which reveals a particular construction of a heat exchange element. In this patent a plurality of aluminum spacers are provided with wings which are made by cutting a tube along parallel lines. These fins and spacers are alternately inserted onto a copper tube whereafter a die of slightly greater outer diameter then the inner diameter of said tubes is mechanically forced therein. This mechanical force is applied sequentially throughout the length of the tube involved and in fact this tube is of relatively short length as are the fins and spacers employed in the aggregate assembly. The use of a mechanical force does not insure an intimate wedding of the materials, nor does it effectively resist the subsequent thermocycling of the assembly to which solar panels will be subjected. Furthermore, it will be noted in this patent that the assembly is of relatively short length relative to which the use of a mechanical die may be appropriate. However, where greater lengths are envisaged, of six feet or greater, the use of a mechanical die would not be appropriate.

I am also aware of Kawano U.S. Pat. No. 3,868,758. In this patent is revealed a method for manufacturing a finned tube as a heat exchanger. Herein a tube made of steel is covered with a thin wall pipe of aluminum having a high thermal expansion coefficient, good heat conductivity and softness. A number of fins are arranged in side-by-side relationship at fixed intervals on the outer periphery of a cylindrical member which is fixed on the thin wall pipe which covers the steel tube. The steel tube is expanded internally by passing a die therethrough, thereby causing the steel tube to press upon the interior surface of the thin wall pipe which expands and makes forced contact with the interior surface of the cylindrical member. This arrangement suffers all of the disadvantages of the other Kawano patent discussed above.

I am also aware of a number of other earlier patents which attempt to make use of multiple materials. These patents include Sandburg U.S. Pat. Nos. 2,722,732 and 2,732,615, Powell U.S. Pat. No. 2,646,259, Scott U.S. Pat. No. 2,311,579, Collura U.S. Pat. No. 3,464,402 and Duncan U.S. Pat. No. 3,089,480. None of these patents provide for an intimate wedding of aluminum and copper or other suitable materials in the manner of my present invention, nor do they provide for avoiding the consequences of thermal cycling such as solar panels are commonly subjected to. Furthermore, known techniques do not provide for the manufacture of solar panels by mass production techniques and in unlimited lengths while at the same time achieving the utilization of the best characteristics of different materials such as aluminum and copper or brass.

SUMMARY OF THE INVENTION

It is an object of the invention to provide an improved method and apparatus for the manufacture of solar panels.

It is another object of the invention to provide an improved solar panel construction employing the best characteristics of different materials which are intimately wedded along the entire length thereof.

It is a further object of the invention to provide an improved method and apparatus for the manufacture of a solar panel with the use of mass production techniques.

Still a further object of the invention is to provide an improved method and apparatus for manufacturing solar panels of combined and different materials which are intimately wedded along the entire facing surfaces thereof.

Yet another object of the invention is to provide improved methods and apparatus for the manufacture of solar panels of different and combined materials which remain intimately wedded despite being subjected to thermal cycling.

Yet another object of the invention is to provide an improved solar panel construction whereby a plurality of solar panels can be assembled together in edge-to-edge relationship.

In achieving the above and other objects of the invention there is provided an improved method comprising fabricating a solar panel of different interior and exterior materials to utilize the structural and heat absorbing properties of the exterior material and the corrosion resistance of the interior material, this fabricating being effected by intimately wedding materials along the entire length of the same by applying a fluid pressure internally against the interior material and simultaneously throughout at least substantially, the entire length of the same, to displace the interior material into intimate contact with the exterior material.

In further accordance with the method of the invention, the fluid pressure is applied with a force which permanently deforms the interior material, but which is within the elastic limit of the exterior material, the pressure being thereafter relieved so that the exterior material contracts against the interior material.

By way of example, the exterior material may be aluminum and the interior material may be copper or brass.

The interior material is preferably supplied in tubular form and the exterior material is extruded to a tubular form having fins diametrically extending therefrom. The exterior material has an inside bore large enough to accomodate the tubular interior material which is inserted into the exterior material prior to the application of the fluid pressure. A spacing of, for example, 0.003 to 0.020 inches on a diametral basis may be employed.

In accordance with the invention, the interior material is softened and the exterior material is hardened prior to the wedding thereof. Furthermore, the exterior material may be extruded such that one of the diametrally extending fins terminates in a socket so that a plurality of such panels can be readily assembled in edge to edge relationship.

According to a feature of the invention, the exterior material or aluminum is preliminarily treated to have a tensile strength in the order of the magnitude of 32,000 psi whereas the interior material which may be copper or brass is soft annealed.

The fluid pressure which is applied is applied as an impact or impulse force to deform the interior material against the exterior material which thereafter compresses against the interior material after which the interior material is work hardened.

According to a further feature of the invention, the exterior material may be provided with a blackened surface. Moreover, the panel may be formed in elongate form to have a length which exceeds the outer diameter of the tubular portion of the exterior material by an order of magnitude of at least about 100 times.

According to a further feature of the invention, the interior material is longer than the exterior material to provide an excess at opposite ends of the exterior material which is engaged for the application of pressure. Moreover, header tubes may be welded to the extensions to provide communication with the panel.

The solar panel of the invention is a solar panel produced according to the aforesaid techniques. It is a panel comprising an exterior member including a tubular portion and fins extending radially from this tubular portion, an interior member extending through and lining this tubular portion and being intimately wedded thereto throughout the entire length of the tubular portion, the interior member being of a material deformed beyond its elastic limit, the exterior member being of an elastic material contracting against the interior member.

As has been noted hereinabove, one of the fins of the panel of the invention may include an edge socket portion whereby to enable assembling a plurality of panels in edge-to-edge-relation. Thus the invention relates further to an assembly comprising a plurality of solar panels such as indicated hereinabove, each panel including one female fin with an edge socket portion therein and one male fin adapted for being inserted into an edge socket portion, the panels being engaged in edge-to-edge relation with the male fins inserted into the socket portions of the female fins.

As will be seen hereinafter, the tubular portions may be circular or polygonal. In fact by virtue of the technique of the invention, any form desired may be given to the tubular portions for purposes of imparting strength thereto or for purposes of providing larger heat transference surfaces with respect to the fluid passing therethrough as will become evident hereinafter. Many other purposes can also be served by the use of the method of the invention.

According to a further aspect of the invention, apparatus is provided for lining an elastic exterior tubular part with an inelastic tubular lining which extends beyond the exterior part in both axial directions. This apparatus comprises first and second means for engaging the inelastic tubular lining externally of the exterior part and at opposite ends of the exterior part respectively. The exterior part extends between these first and second means. Third means are provided for applying a fluid pressure through the first means into the tubular lining to deform the lining against the exterior part simultaneously along the entire length of the exterior part.

The third means may include a source of fluid and impulse means coupling this source to the said first means, said impulse means being adapted for delivering an impact force to the fluid to deform the lining against the exterior part.

The apparatus of the invention may further comprise relief valve means coupled to the second means for limiting fluid pressure within the lining to an amount less than the elastic limit of the exterior part.

According to a feature of the invention, the first and second means may each include a hollow mandrel extending into the lining and clamping parts to clamp the lining against the hollow mandrel and to support the lining. The first and second means may each also include toggle means for displacing the associated mandrel relative to the clamping part and axially into and out of the lining.

The impulse means employed in accordance with the invention may include a cylinder coupled to the source with a piston floating in the cylinder and a plate superposed on the piston without connection to the same and ram means adapted to impart an impact force to the piston via the plate.

According to a further feature of the invention, a check valve may be located between the cylinder and the source to prevent reverse flow during impact.

The above and other features, objects and advantages of the invention will be better understood from a detailed description of a preferred embodiment which follows hereinafter.

BRIEF DESCRIPTION OF THE DRAWING

In the drawing:

FIG. 4 is an end view of a solar panel according to a modification;

FIG. 5 illustrates an end view of another modification;

FIG. 6 illustrates an end view of another modification of the solar panel of the invention;

FIG. 8 is a diagrammatic illustration of the apparatus of the invention provided for the manufacture of the above indicated solar panel;

FIG. 10 is a partially sectional side view of the apparatus component employed for supporting a solar panel and delivering pressure thereto at one end of the panel involved; and FIG. 11 illustrates inside and partially sectional view the apparatus component employed at the other end of the solar panel, provision being made for pressure relief.

DETAILED DESCRIPTION

Figure 1:
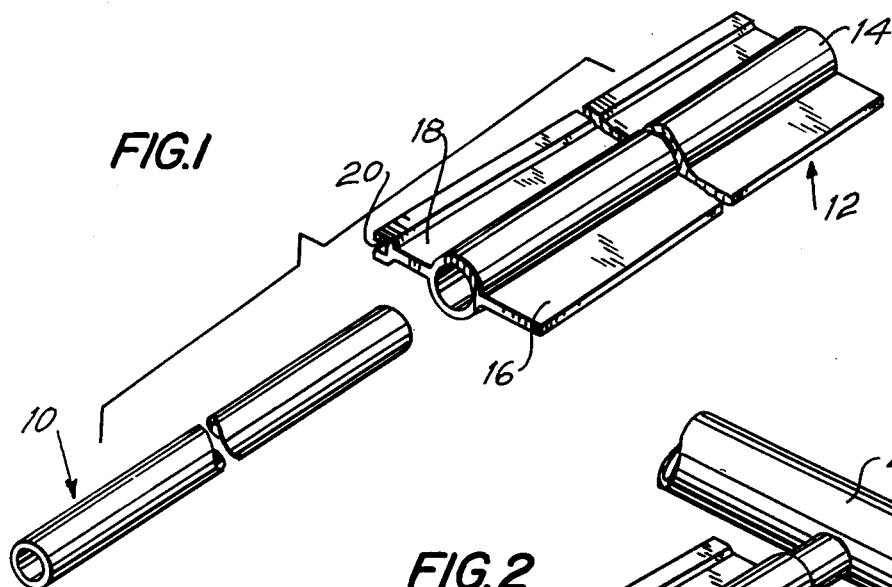
FIG. 1 is a perspective exploded view of a solar panel provided in accordance with the invention.

Solar collectors or panels in general consist of a flat plate called an absorber finished in a manner that enables it to be receptive to solar rays. The configuration of such a panel is such that water is permitted to circulate either through or on its surface. This provides the means of transporting the absorbed heat to the associated storage. Such a plate or panel may be placed in a container having a transparent cover and thereafter the panel is exposed to the sun. The solar radiation is permitted to impinge upon the surface thereof without any heat losses to the environment or ambient atmosphere due to convective air currents.

My present invention is primarily directed to improved solar plates or panels and to improved methods and apparatus for the manufacture thereof. I have worked with the premise that due to the presence of water or the like on one side of the panel, it would be preferable to employ copper or brass as a material suitable for contacting the water for purposes of corrosion resistance. Copper or brass is relatively expensive and difficult to work with. For this reason, aluminum has constituted the prime material for manufacture of solar panels. It is light and relatively inexpensive. However, there is a serious potential for corrosion and accompanying deterioration of this material when it is immersed in untreated water for long periods of time.

Although I shall generally refer to aluminum and copper or brass herein, it is to be understood that my invention relates as well to the use of materials which on the one hand provide advantageous structural and heat absorption characteristics or the like and which on the other hand provide for corrosion resistance relative to fluids such as water and the like.

My invention provides for combining aluminum and brass or copper in a manner which results in a solar panel or absorber plate that combines the best features of both materials. Moreover as has been indicated hereinabove, my invention provides many advantages previously unobtainable by processes utilized heretofore.

The basic concept of my invention may be generally indicated as follows:

Aluminum material is extruded in a form which consists of a thin wall tube together with fins or wings affixed diametrically to two opposite sides thereof. The outer edge of one fin is given a configuration which is essentially in the form of a U or socket with an internal dimension capable of accepting the unformed and clean side fin of another similar extrusion. This results in the capability of providing for the assembly of many panels in side-by-side or edge-to-edge relationship which in turn provides for a modular type assembly suitable for use in capturing solar radiation.

A thin wall brass or copper tube is inserted into the extrusion. The clearance between the outside diameter of the brass or copper tube and the inside diameter of the aluminum extrusion is such as to permit ease of assembly. Pressure is then exerted internally of the brass or copper tubing to the extent that it permanently deforms outwardly against the aluminum extrusion. This deformation is carried out to the extent that the brass or copper tubing will permanently deform while the aluminum extrusion will deform only to the limit of its elasticity at the most. In other words, the aluminum is never deformed beyond its elastic limit.

When the internal pressure is released, the aluminum extrusion snaps back to a position which causes a pressure to be exerted at the faying surfaces. This contraction results in a thermally sound bond which permits the aluminum to transmit its heat through the brass or copper without loss or interference. Another result of permitting the contraction of the aluminum against the internal lining tube will be discussed hereinafter.

By way of further refinement, the external surface of the aluminum extrusion can be provided with a black anodic coating and the lining tube is so designed as to extend outwardly from the extrusion in both axial directions to provide for connection of a brass or copper tube to provide for a complete solar panel assembly. According to the technique employed, it is possible to produce panels of any desired length such as, for example, lengths of 6 or 8 feet and greater are readily produced by use of the techniques of the invention.

The procedure of the invention provides the means and techniques of joining a brass or copper lining tube to the inside surface of an aluminum tube in an extremely tight manner. The constant pressure at the faying surface has a multi-fold purpose. It provides the ability to transfer heat, it has the ability to prevent atmospheric intrusion thus avoiding corrosion. The flexible mechanical clamping which is provided maintains the necessary pressure throughout dimensional excursion caused by differential thermal expansion as caused by the diverse nature of the media in contact with the involved surfaces.

More specifically according to the invention, a soft annealed copper or brass tube (as determined by its ability to resist a total diametrically disposed collapse without exhibiting any cracks) is internally inserted in an aluminum extrusion including a tubular portion which has been previously heat treated to a tensile strength of 32,000 psi, which constitutes its elastic limit. The copper or brass tubing is commercially available and may be made, for example, by heating the same to 800° F for 1 hour under ambient atmospheric conditions. The initial fit between these two components may provide for a diametral spacing of 0.003 to 0.020 inches when using, for example, one half inch nominal outside diameter copper or brass tubing.

As will be shown, die halves or clamping parts are closed on the two extending ends causing the tubing outer surface to be restrained to a fixed diameter as well as supporting the tubing and the extrusion thereupon. Hollow steel mandrels are placed into the extending ends of the soft lining tubing with sufficient axially disposed force to cause a metallic seal to occur between the inside diameter of the restrained soft tubing and the tapered mandrel surface. One mandrel is attached to a pipe leading to a pressure source while the other is attached to an adjustable relief valve. A valve is adjusted on the relief valve side of the assembly and water is introduced into the arrangement causing all entrapped air to be vented through the open valve. The valve is then closed and the water pressure is increased to approximately 200 psi via a pump which is included in the system. This tests for severe leaks and establishes a homogenity of water content in the case of smaller tolerable leaks, thus precluding air intrusion.

A ram of a punch press which is mentioned by way of example is actuated causing a valve to close between a water source and the above described assembly. This is followed immediately by a severe impact against a piston located in a cylinder in an assembly to be described hereinafter which is in series with the above assembly. When utilizing for example, a one-half inch nominal outside diameter tubing with a six foot panel length, a cylinder of approximately three quarters of an inch diameter and two and one-half inch bore function satisfactorily in conjunction with a forty ton capacity two and a half inch stroke punch press which is utilized to provide the striking impact or impulse force.

The stroke of the piston causes the water in the system to reach the set point of the relief valve mentioned above. This pressure for example, may be 8900 psi for the above mentioned one-half inch tubing. It causes an internal stress in the tubing to reach approximately 31,000 psi. The stress is approximately three times the yield stress of the soft copper or brass lining tubing and causes it to deform permanently outwardly against the aluminum extrusion in an uncontrolled manner until it contacts the interior surface of the surrounding aluminum tube.

At this point, the aluminum is deformed outwardly, but not on a permanent basis due to the fact that the 31,000 psi is within its elastic limit. The aluminum, however, deforms or stretches radially on a temporary basis with the soft copper or brass tubing following on a permanent basis. When the pressure relaxes, the aluminum in striving to return to its original size presses firmly against the internally disposed copper or brass tube which yields slightly in compression. The rapid expansion of the copper or brass tubing followed by the sudden high compressive action causes work hardening of the copper or brass tubing to occur. This provides a strength to the copper or brass tubing and enables it to elastically track the aluminum through subsequent minor dimensional excursions caused by the differential expansion experienced by the reaction of the dissimilar materials to thermal application.

When the assemblies are removed from the dies and the mandrels are removed, the bonded unit is finnished as a module and is ready for assembly into a group of similar units thus creating a radiant panel assembly. The pressure and time cycles necessary to accomplish the aforesaid technique vary depending upon the diameter and length of the units being bonded, but the procedure remains generally the same.

Referring now to FIG. 1, the brass or copper lining tube or interior material is indicated at 10 whereas the aluminum extrusion is indicated at 12. The aluminum extrusion includes a tubular portion 14 and fins 16 and 18 extending radially or diametrally relative to tubular portion 14. As will be described in greater detail hereinafter, the fin 18 is provided with a female part or socket portion 20 which enables the panel to be assembled with another like panel to constitute an assembly of a plurality of solar panels.

Figure 2:
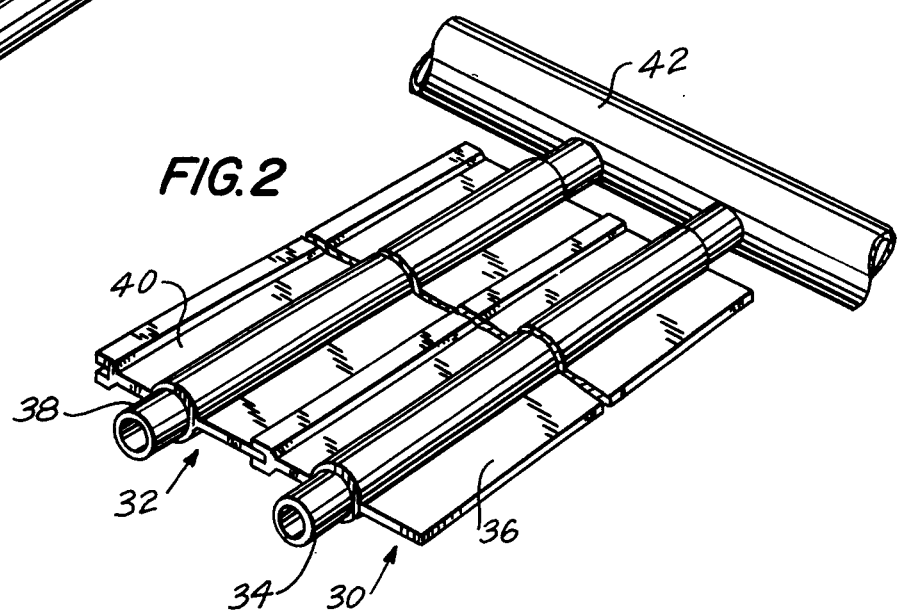
FIG. 2 is a perspective view of an assembly of solar panels connected to a header in accordance with the invention.

Reference to FIG. 2 shows an assembly of a first panel 30 and a second panel 32, these panels being of the shape previously indicated. In FIG. 2 it will be seen that the panel 30 includes an interior or lining tube 34 which extends through the aluminum extrusion 36. The panel 32 likewise includes an interior lining tube 38 which extends beyond the associated aluminum extrusion 40 in both axial directions. The extension of the lining tube beyond the associated extrusion provides for the application of pressure in the formation stage as will be described in greater detail hereinafter. It also provides for the welding thereto of a header tube such as indicated at 42. This header tube may be fabricated for example of copper or brass. It will be welded or brazed or otherwise connected to the lining tubes to afford fluid connection in a closed fluid circuit to the associated panels.

As will be shown hereinafter, the length of the panels can vary as desired because the techniques of the invention employed in manufacture are not limited to any particular length. The fact that the panels are provided in separate, but engagable modules means also that the solar panel assembly of the invention may assume virtually any desired width so that the resulting assembly can be readily adapted to the size of a previously erected structure or dwelling into which the panels or panel assemblies are to be incorporated.

Figure 3:
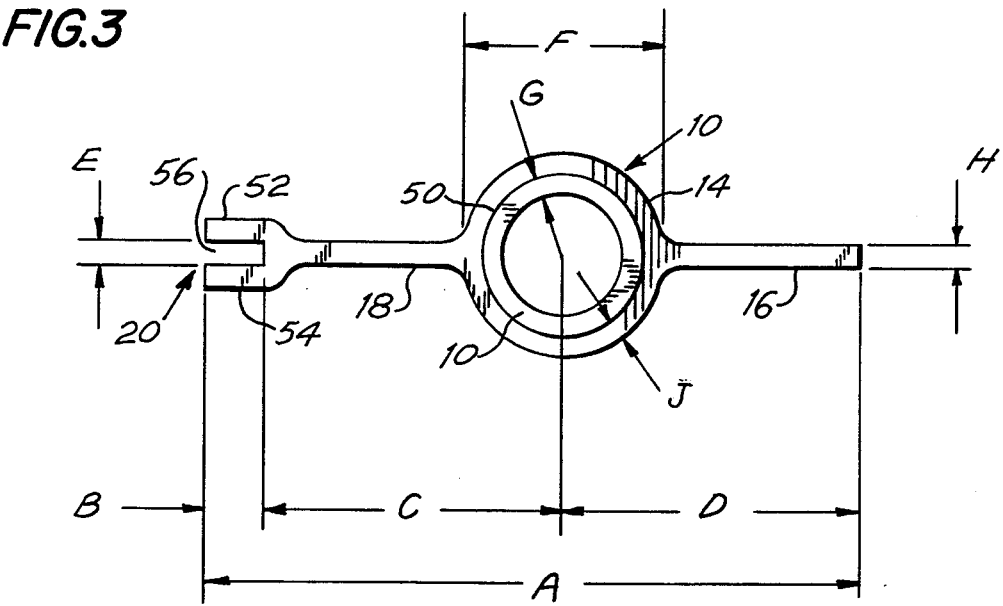
FIG. 3 is an end view of a solar panel provided in accordance with the invention and corresponding to the solar panels of FIGS. 1 and 2.

FIG. 3 illustrates in end view the assembled solar panel 10 of FIG. 1. Herein can be seen the fin 16 and the fin 18 in coplanar relationship extending diametrally from the tubular portion 14. Also can be seen the lining or interior tube 10 in intimate wedded engagement along the faying surface 50.

Also seen in FIG. 3 is the female or socket portion 20 including straddling limbs 52 and 54 bracketing an opening 56 into which can be inserted the free and plain end of another panel corresponding to fin 16.

FIG. 4 illustrates a modification of the solar panel of FIGS. 1-3. The panel of FIG. 4 employs a diamond shaped tubular portion 60 as the central part of the solar panel which furthermore includes fins 62 and 64 of the form described above.

FIG. 5 illustrates a further embodiment of the invention whereby the lining and tubular portion of the solar panel as indicated at 66 is of a square cross-section.

FIG. 6 illustrates still a further modification of the invention according to which the central tubular portion of the solar panel is of oval cross-section as shown at 68.

Figure 7:
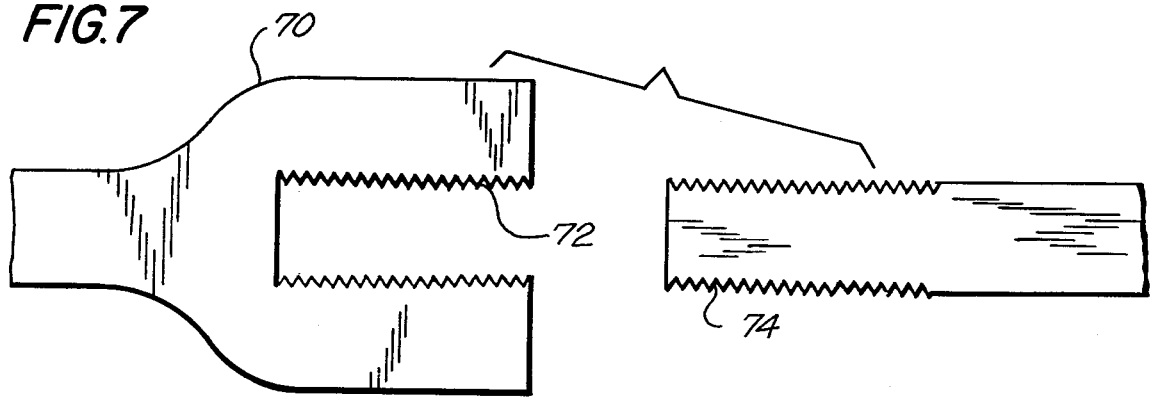
FIG. 7 is a fragmentary end view illustrating a modification of the invention for the attachment of two adjacent solar panels.

Still another modification of the invention is illustrated in FIG. 7 wherein it is seen that adjacent solar panels are provided with cooperating and interengagable sections consisting of a socket portion 70 provided with interior teeth 72 and with a serrated or toothed portion 74 on the fin of the adjacent panel so that the two parts may be interengaged and locked together.

FIG. 8 illustrates diagrammatically the apparatus of the invention. This apparatus includes a first means indicated at 80 and a second means indicated at 82. As will be shown hereinafter, these means include clamp parts adapted for clamping the lining tube against respective mandrels 84 and 86 which are hollow steel mandrels capable of supporting the relatively soft lining tube for the application of pressure into the lining tube. It will also be noted in FIG. 8 that the external aluminum extrusion 87 extends between the first and second means 80 and 82.

Feeding into the mandrel 84 is a pipe 88 leading from an impulse cylinder 90 to which impact is applied by means of a ram of an associated punch press indicated diagrammatically at 92.

Leading into the impulse cylinder 90 is a pipe 94 in which is inserted a valve 96 leading from a pump 98 coupled in turn via a pipe 100 to a water supply 102.

Connected to the distal end of the second means 82 and to the mandrel 86 therein are a plurality of adjustable relief valves 104, 106, and 108. A bleeding valve 110 may also be provided at the distal end of the mandrel 86.

In operation, valve 110 and valve 96 are opened. Water is pumped by pump 98 through the system including impulse cylinder 90 and through the interior lining tube indicated at 112. After water fills the system, valve 110 is closed. The pump is employed to raise the pressure in the system to approximately 200 psi to check for leaks as has been indicated hereinabove. Thereafter valve 96 is closed and this is followed by actuation of the punch press 92 to impart an impact or impulse of pressure to the system as has been discussed hereinabove. The pressure rises in the system to the preset value or values of the valves 104, 106, and 108 which limit the pressure peak obtained within the system. This pressure peak will be such as to force the lining against the exterior aluminum extrusion to an extent which does not exceed the elastic limit of the aluminum extrusion. This results in the contraction of the aluminum extrusion after the peak has been passed which thereby compresses the copper or brass lining tube which work hardens the latter and permits the lining to follow the aluminum extrusion during thermal excursions upon the application of heat and cold cycles thereafter.

Figure 9:
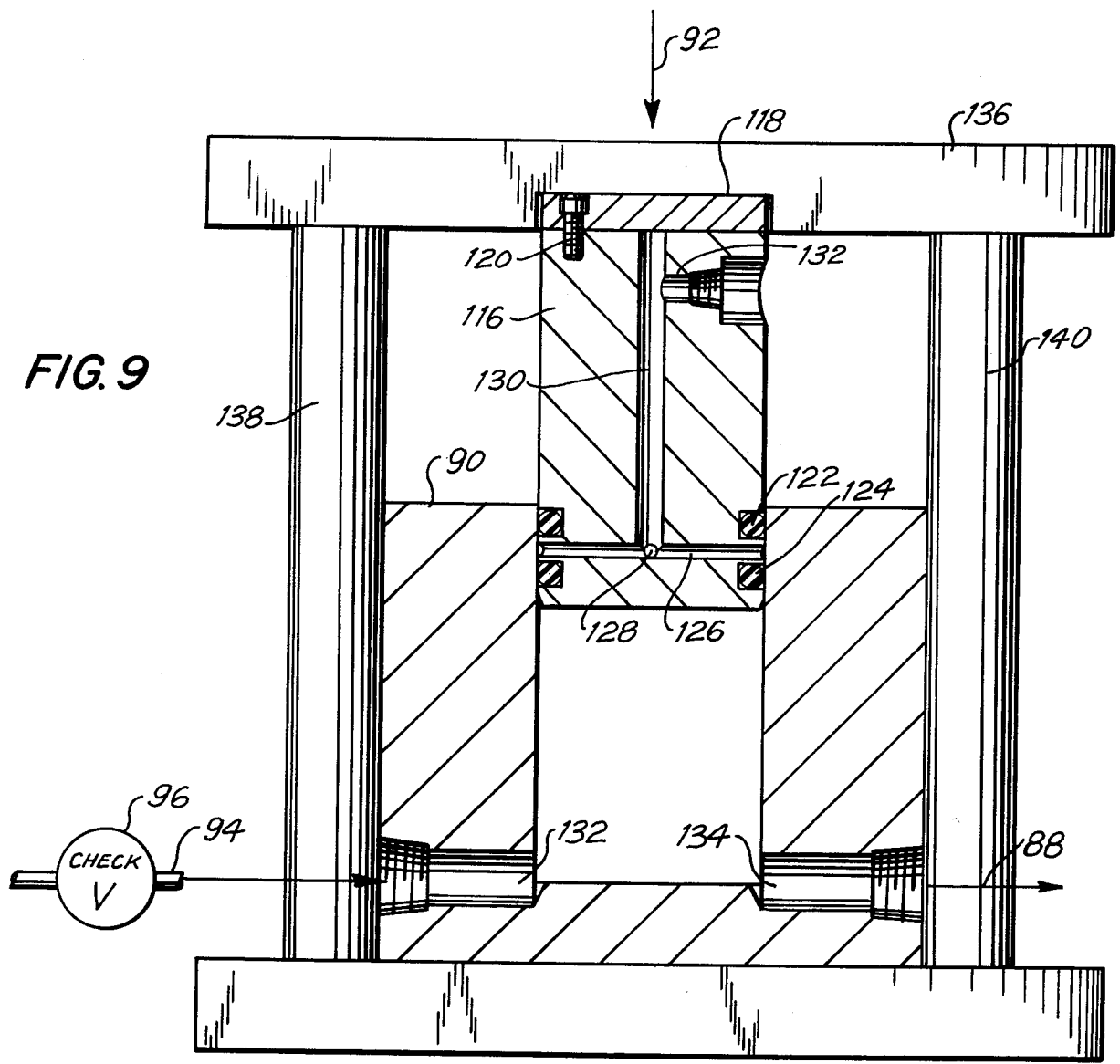
FIG. 9 is a cross-sectional view of a portion of the apparatus employed for delivering impact or impulse forces.

FIG. 9 illustrates the impulse cylinder 90 within which floats the piston 116. The piston 116 may be fabricated of aluminum and may be provided with a steel cap 118 fastened thereto by means of one or more fastening pins 120.

As will be seen, the piston is provided with two O-rings 122 and 124, to the vicinity of which leads an annular groove 126. Communication with the annular groove 126 takes place via diametral bore 128, axial bore 130 and bore 132 which permits the administration of grease or other such lubricant to facilitate excursion of the piston.

The input of fluid to the impulse cylinder 90 takes place via bore 132 to which leads line 94 as indicated above, the check valve 96 being indicated in diagrammatic form in FIG. 9.

The output from cylinder 90 travels through bore 134 into line 88 as has been indicated hereinabove.

On top of piston 116, but not connected thereto is a plate 136 which is capable of vertical travel along guides 138 and 140. These guides may be for example, one inch diameter posts made of hardened steel or the like. The plate 136 constitutes the means of transferring impact from the ram of punch press 92 to the piston 116. The free floating piston is employed to avoid air inclusion into the system.

FIG. 10 illustrates the details of connection to the left end of lining tube 112 appearing in FIG. 8. Herein is seen the hollow mandrel 84 and the two clamping parts 150 and 152 of the first means 80 (FIG. 8). The clamping parts 150 and 152 are adjustably held together by means of a threaded bolt arrangement indicated generally at 154. It will be appreciated that a pneumatic or an electromagnetically based system or a toggle system can be substituted for the threaded bolt arrangement 154 for purposes of facilitating engagement of the left end of lining tube 112.

The hollow mandrel 84 is mounted on a block 156 accomodated on a slide 158, the block being engaged by means of a pin 160 coupled to a rod 162 connected in turn to a toggle arrangement indicated generally at 164. Operation of handle 166 of the toggle unit 164 permits withdrawel and insertion of mandrel 84 into which pressure is applied via bore 168.

The insertion of mandrel 184 entraps the left bend of lining tube 112 between the mandrel and the clamp parts 150 and 152 whereby the relatively soft lining tube 112 is supported and whereby application of an impulse pressure into the lining tube and extrusion assembly is enabled.

FIG. 11 illustrates the details of the second means 82 (FIG. 8) and it is seen that this portion similarly includes two clamping parts indicated at 180 and 182 respectively. Also appearing in FIG. 11 is the hollow mandrel 86 mentioned hereinabove, this hollow mandrel being attached to a block 184 supported on a slide 186 and connected through a rod 188 to a toggle unit 190. Operation of handle 192 of toggle unit 190 permits the withdrawal and insertion of hollow mandrel 86 into the right end of the lining tube 112 accomodated between clamp parts 180 and 182.

Mounted atop block 184 is indicated by way of example, a single relief valve 194 illustrative of valves 104, 106, and 108 in FIG. 8. Valve 194 is adjustable as indicated by manually adjustable member 196, both the valve 194 and member 196 being of commercially available construction.

Valve 194 communicates with hollow mandrel 86 via bores 198 and 200 respectively.

From what has been indicated hereinabove it will now be seen that the invention provides a method for fabricating a solar panel of different interior and exterior materials to utilize the structural and heat absorbing properties of the exterior material and the corrosion resistance of the interior material, said fabricating being effected by intimately wedding the materials along the entire lengths of the same by applying a fluid pressure internally against the interior material and simultaneously throughout at least substantially the entire length of the same to displace the interior material into intimate contact with the exterior material. The fluid pressure is applied with a force which permanently deforms the interior material but which is within the elastic limit of the exterior material and thereafter the pressure is relieved so that the exterior material contracts against the interior material thereby work hardening the latter so that subsequent thermal excursions of the exterior material can be readily followed.

It will also now be understood that there is provided in accordance with the invention apparatus for lining an elastic exterior tubular part with an inelastic tubular lining which extends beyond the exterior part in both axial directions, said apparatus comprising first and second means for engaging the inelastic tubular lining externally of said exterior part and at opposite ends of the exterior part.

By way of non-limitative example and with reference to FIG. 3, a solar panel having a length of five or six feet or greater may be the following dimensions:

A — 2.160 inches
B — 0.200 inches
C — 0.980 inches
D — 0.980 inches
E — 0.082 inches
F — 0.653 inches
G — 0.018 inches
H — 0.070 inches
J — 0.070 inches There will now be obvious to those skilled in the art many modifications and variations of the article of manufacture, method and apparatus disclosed hereinabove. Such modifications and variations will not depart from the scope of the invention if defined by the following claims.

What is claimed is:

1. A method comprising fabricating a solar panel of different interior and exterior materials to utilize the structural and heat absorbing properties of the exterior material and the corrosion resistance of the interior material, said fabricating being effected by intimately wedding the materials along the entire length of the same by applying a fluid pressure internally against the interior material and simultaneously throughout at least substantially the entire length of the same to displace the interior material into intimate contact with the exterior material, the fluid pressure being applied with a force which permanently deforms the interior material and elastically deforms the exterior material within the elastic limit of the exterior material, and thereafter relieving said pressure so that the exterior material contracts against the interior material to work harden the interior material.

2. A method as claimed in claim 1 wherein the exterior material is aluminum and the interior material is copper or brass.

3. A method as claimed in claim 1 wherein the interior material is supplied in tubular form and the exterior material is extruded to at least partly tubular form having an inside bore large enough to accommodate the tubular interior material, the interior material being inserted into the exterior material prior to the application of said pressure.

4. A method as claimed in claim 2 wherein the interior material is supplied in tubular form and the exterior material is extruded to at least partly tubular form having an inside bore large enough to accommodate the tubular interior material, the interior material being inserted into the exterior material prior to the application of said pressure.

5. A method as claimed in claim 4 wherein the spacing between the material is .003 to .020 inches on a diametral basis before said pressure is applied.

6. A method as claimed in claim 1 wherein the interior material is softened and the exterior material is hardened prior to being wedded.

7. A method as claimed in claim 4 wherein the interior material is softened and the exterior material is hardened prior to being wedded.

8. A method as claimed in claim 7 wherein the exterior material is extruded to have diametrically extending fins with one of said fins terminating in a socket so that a plurality of said panels can be readily assembled in edge-to-edge relation.

9. A method as claimed in claim 6 wherein said pressure is applied as an impact force to deform the interior material against the exterior material which thereafter compresses against the interior material whereby the interior material is work hardened.

10. A method as claimed in claim 1 comprising blackening the exterior material.

11. A method as claimed in claim 8 comprising blackening the exterior material.

12. A method as claimed in claim 3 comprising forming the panel in elongate form to have a length which exceeds the outer diameter of the tubular portion of the exterior material by an order of magnitude of at least about one hundred times.

13. A method as claimed in claim 3 wherein interior material is longer than the exterior material to provide an excess at opposite ends of the exterior material which is engaged for the application of said pressure.

14. A method as claimed in claim 3 wherein the exterior material is extruded to have diametrically extending fins with one of said fins terminating in a socket, and assembling a plurality of said panels in edge-to-edge and fin-to-socket relation.

15. A method as claimed in claim 2 wherein the aluminum is preliminarily treated to have a tensile strength in the order of magnitude of 32,000 psi and the interior material is soft annealed.

16. A method as claimed in claim 1 wherein the force applied by the fluid pressure produces stress in the outer material in the vicinity of the elastic limit.

* * * * *